(12) United States Patent
Van Der Wateren

(10) Patent No.: US 8,295,183 B2
(45) Date of Patent: Oct. 23, 2012

(54) MONITORING AND INFLUENCING THE BEHAVIOR AND STATUS OF WIRELESS SENSOR NETWORKS

(75) Inventor: Frits Van Der Wateren, Haarlem (NL)

(73) Assignee: Chess ET International BV, Haarlem (NL)

( * ) Notice: Subject to any disclaimer, the term of this patent is extended or adjusted under 35 U.S.C. 154(b) by 861 days.

(21) Appl. No.: 12/319,945

(22) Filed: Jan. 13, 2009

(65) Prior Publication Data

US 2009/0316624 A1 Dec. 24, 2009

Related U.S. Application Data

(63) Continuation-in-part of application No. 12/215,040, filed on Jun. 23, 2008.

(51) Int. Cl.
*H04L 12/26* (2006.01)
(52) U.S. Cl. ........................................................ 370/241
(58) Field of Classification Search .................. 370/241, 370/242, 250, 310, 345–349, 400, 464, 498; 709/223–226, 243, 249
See application file for complete search history.

(56) References Cited

U.S. PATENT DOCUMENTS

| | | | | |
|---|---|---|---|---|
| 6,487,183 B1 * | 11/2002 | Lo et al. | | 370/326 |
| 7,216,365 B2 | 5/2007 | Bhagwat et al. | | |
| 7,764,706 B2 * | 7/2010 | Tavli et al. | | 370/444 |
| 7,822,852 B2 * | 10/2010 | Qi et al. | | 709/224 |
| 7,881,340 B2 * | 2/2011 | Farrag et al. | | 370/468 |
| 7,885,240 B2 * | 2/2011 | Joshi et al. | | 370/337 |
| 2004/0253996 A1 | 12/2004 | Chen et al. | | |
| 2008/0181130 A1 * | 7/2008 | Balu et al. | | 370/254 |
| 2009/0046675 A1 * | 2/2009 | Pratt et al. | | 370/337 |

OTHER PUBLICATIONS

Kredo et al., "Medium access control in wireless sensor networks", Jul. 2006, pp. 961-994, Computer Networks v51.
Ding et al, "Reliable broadcast in ZigBee networks", 2005, pp. 510-520, 2nd IEEE conference on sensors and ad hoc communications and networks.
IEEE Computer Society, "IEEE standard for information technology—Part 15.4 Wireless medium access control (MAC) and physical layer (PHY) specifications for low-rate wireless personal area networks (WPANs)", 2006, IEEE, 322 pages.

* cited by examiner

*Primary Examiner* — Dmitry H Levitan
(74) *Attorney, Agent, or Firm* — Lumen Patent Firm

(57) ABSTRACT

Monitoring the status and behavior in a wireless network is provided. In a wireless network of operational nodes, one or more monitoring nodes are embedded in the network to monitor the status and behavior of the network without unintentionally disturbing the network. The monitoring nodes receive state information from the operational nodes. The operational nodes can be nodes in a wireless sensor network or a broadcast-only distributed wireless network. State information is sent in small state messages during the idle period of the communication frame of the operational node to be received by monitoring nodes. Transmission of state messages in the idle period for monitoring purposes does not disturb communication between operational nodes and can be energy efficient. The monitoring nodes can also intercept communications between operational nodes. Providing feedback to and influencing operational nodes are also provided.

22 Claims, 14 Drawing Sheets

MONITORING AND INFLUENCING THE BEHAVIOR AND STATUS OF WIRELESS SENSOR NETWORKS

CROSS-REFERENCE TO RELATED APPLICATIONS

This application is a continuation-in-part of U.S. patent application Ser. No. 12/215,040 filed Jun. 23, 2008, which is incorporated herein by reference in its entirety.

FIELD OF THE INVENTION

The invention relates generally to wireless sensor networks. More particularly, the present invention relates to monitoring the behavior and status in wireless sensor networks.

BACKGROUND

Wireless networks, such as wireless sensor networks (WSNs), serve a wide variety of applications, including monitoring, imaging, and tracking, for industrial and military applications. Many existing wireless networks rely on a media access control (MAC) layer using time division multiple access (TDMA) protocols to manage the communication between nodes of the wireless network. The design of the MAC layer and TDMA protocols must take into account the possible complexities of the network involving mobile nodes and energy consumption considerations. Energy efficiency is particularly important for certain sensor or actuator devices with lifetimes determined by the built-in batteries of the devices.

TDMA protocols enable multiple nodes to share a single communication channel by partitioning the communication channel into multiple slots. However, communication in a network with existing TDMA-based MAC layers typically requires one or more central or beacon controllers to coordinate the allocation and timing of the slots. In addition to coordinating the TDMA schedules, central control is necessary to maintain synchronization of the nodes. The scalability of centralized wireless networks, however, is inherently limited as a central controller can only manage a finite number of nodes. Furthermore, for networks having mobile nodes, the central controller must also account for nodes joining and leaving the network. For large networks, this accounting can be prohibitively burdensome.

In addition to being centralized, existing networks typically communicate using address-specific messaging. In other words, a transmitted message must include an address for the recipient. The use of addresses requires each node to know, store, and process information regarding other nodes in the network, which can be time and energy consuming. Address-specific messaging also generally requires RTS (request to send), CTS (clear to send), or ACK (acknowledge) messages or functions, which further increases usage of energy and time.

The TDMA protocols used in existing wireless networks typically possess fixed properties, such as the number and allocation of the TDMA communication slots. For networks with high node density, collisions often occur because the fixed TDMA protocols are inadequate for the large number of nodes transmitting and receiving messages and cannot adjust to accommodate the required high data rates. On the other hand, for networks with low node density, the number and allocation of TDMA communication slots are often in excess of the actual usage by the network. Under the latter situation, resources can be wasted and performance may suffer.

The performance and efficacy of wireless sensor networks (irrespective of the MAC or TDMA protocol of the network) can be analyzed by monitoring the behavior and status of the network. However, monitoring wireless sensor networks can be a difficult task, particularly for large networks having thousands of nodes. One method of monitoring the behavior of a single node includes connecting the node to a computer, such as a laptop. However, this monitoring procedure can only be practically accomplished for a few nodes and will quickly become cumbersome for a large network. This monitoring procedure is particularly difficult if the nodes are mobile. Another drawback of the method of directly connecting to a node is the intrusive nature of the connection. In other words, the connection of a node to a laptop would likely influence the behavior of the node and the rest of the network, thereby an analysis from such a connection would give a false evaluation of the undisturbed network. In addition, existing methods of monitoring networks require large amounts of energy from the nodes being monitored. This is problematic as node power supplies are generally very limited.

SUMMARY OF THE INVENTION

The present invention addresses at least the difficult problems of monitoring the status and behavior of a wireless network and advances the art with methods and systems having monitoring nodes embedded in a wireless network of operational nodes. It is important to distinguish between operational nodes and monitoring nodes. Operational nodes are deployed primarily to serve one or more operations or purposes, such as sensing a condition in the environment, agricultural monitoring, tracing goods, etc. For example, in an embodiment with a WSN, the sensor or actuator devices of the WSN are herein referred to as operational nodes. The nodes described in U.S. patent application Ser. No. 12/215, 040 filed Jun. 23, 2008, which is incorporated herein by reference, are also herein referred to as operational nodes. Correspondingly, operational messages refer to messages sent between operational nodes. In contrast, monitoring nodes are deployed to monitor the behavior and status of the operational nodes and are not necessarily deployed for the purposes of the network. It is noted that a node may have a combination of monitoring and operational capabilities, e.g. a monitoring node can also include a sensor and can be used for the sensor analysis of a WSN. In FIGS. 1-14B, operational nodes are represented by the label 'N', whereas monitoring nodes are represented by the label 'M'.

The present invention is directed to a system and a method for monitoring behavior and status of a wireless sensor network of a plurality of operational nodes. The operational nodes are wirelessly connected for communication by using repeated communication frames, wherein the communication frames include an idle period and an active period, wherein one or more operational messages are sent and received in the active period. The present invention is directed to one or more monitoring nodes, wherein at least one of the monitoring nodes is communicatively connected to at least one of the operational nodes. A state transmit function is provided for one or more of the operational nodes to transmit a state message to be received by one or more of the monitoring nodes. A state receive function is also provided for one or more of the monitoring nodes to receive transmitted state messages. The state message includes state information about the operational node transmitting the state message and the state information can be used to monitor the behavior and status of the operational nodes, a local neighborhood of the operational node, or the entire network.

State information contained in a state message can be any type of information useful in analyzing the behavior or status of the network. In an embodiment, the state information is selected from the group consisting of a node identifier, a slot allocation, a number of collisions, a local energy supply, a number of neighbors, a state of the media access control (MAC), synchronization information, a reception level, a reception quality, and a current local random number.

In a preferred embodiment, the state message is transmitted in a random position of the idle period of the communication frame of the operational node transmitting the state message. In an embodiment, the operational nodes communicate with each other through a broadcast-only communication system. In another embodiment, an intercept function is provided for allowing the monitoring nodes to intercept communications between the operational nodes, such as by intercepting the operational messages sent between operational nodes. In an embodiment, the intercepted operational messages is associated with one of the state messages, wherein both the of the associated operational and state messages are transmitted by the same operational node, and wherein the association is used to analyze the behavior of the transmitting operational node.

Preferably, the monitoring nodes continually listen for transmitted state messages. In a preferred embodiment, at least one of the monitoring nodes is communicatively connected to a computing device, such as a personal computer or a laptop computer, wherein the state information received by the connected monitoring node is transmitted to the computing device and the computing device provides power to the connected monitoring node.

In an embodiment, a monitoring node can also influence the behavior of one or more operational nodes. In such an embodiment, a feedback function is provided for allowing one of the monitoring nodes to transmit a feedback message to be received by one or more of the operational nodes. Preferably, the feedback message includes feedback information used to change the behavior of the operational node receiving the feedback message. The feedback message can be sent through a dedicated channel for the operational nodes to receive the feedback message. In an embodiment, the operational nodes communicate using a time division multiple access (TDMA) slots, wherein one of the slots is dedicated for receiving feedback messages from monitoring nodes.

In an embodiment, at least two of the monitoring nodes are communicatively connected. State information received by connected monitoring nodes can be correlated for a correlated analysis of the operational nodes of the network. In another embodiment, a monitoring node is moveable, wherein the monitoring node is moved to monitor multiple regions of the network.

BRIEF DESCRIPTION OF THE FIGURES

The present invention together with its objectives and advantages will be understood by reading the following description in conjunction with the drawings, in which.

DETAILED DESCRIPTION OF THE INVENTION

Part I of this section is directed to systems and methods of communication between nodes of a wireless network, which is further described in U.S. patent application Ser. No. 12/215,040 filed Jun. 23, 2008, which is incorporated herein by reference. Part II of this section is directed to monitoring the behavior and status of wireless networks. It is noted that an "operational node" described in Part II can be, but is not restricted to be, a "node" described in Part I; an "operational node" of Part II can be a node of any wireless network, as would be appreciated by one of ordinary skill in the art.

Part I: Broadcast-only Distributed Wireless Network

A communication system between a plurality of nodes in an ad-hoc network can be difficult to implement, particularly with mobile nodes, commonly found in ad-hoc wireless sensor networks. The present invention is directed to communication between nodes in a distributed network using a media access control (MAC) layer optimized for gossip protocols. The scalability of the communication system of the present invention is apparent by the communication system's decentralized and distributed nature.

Figure 1:
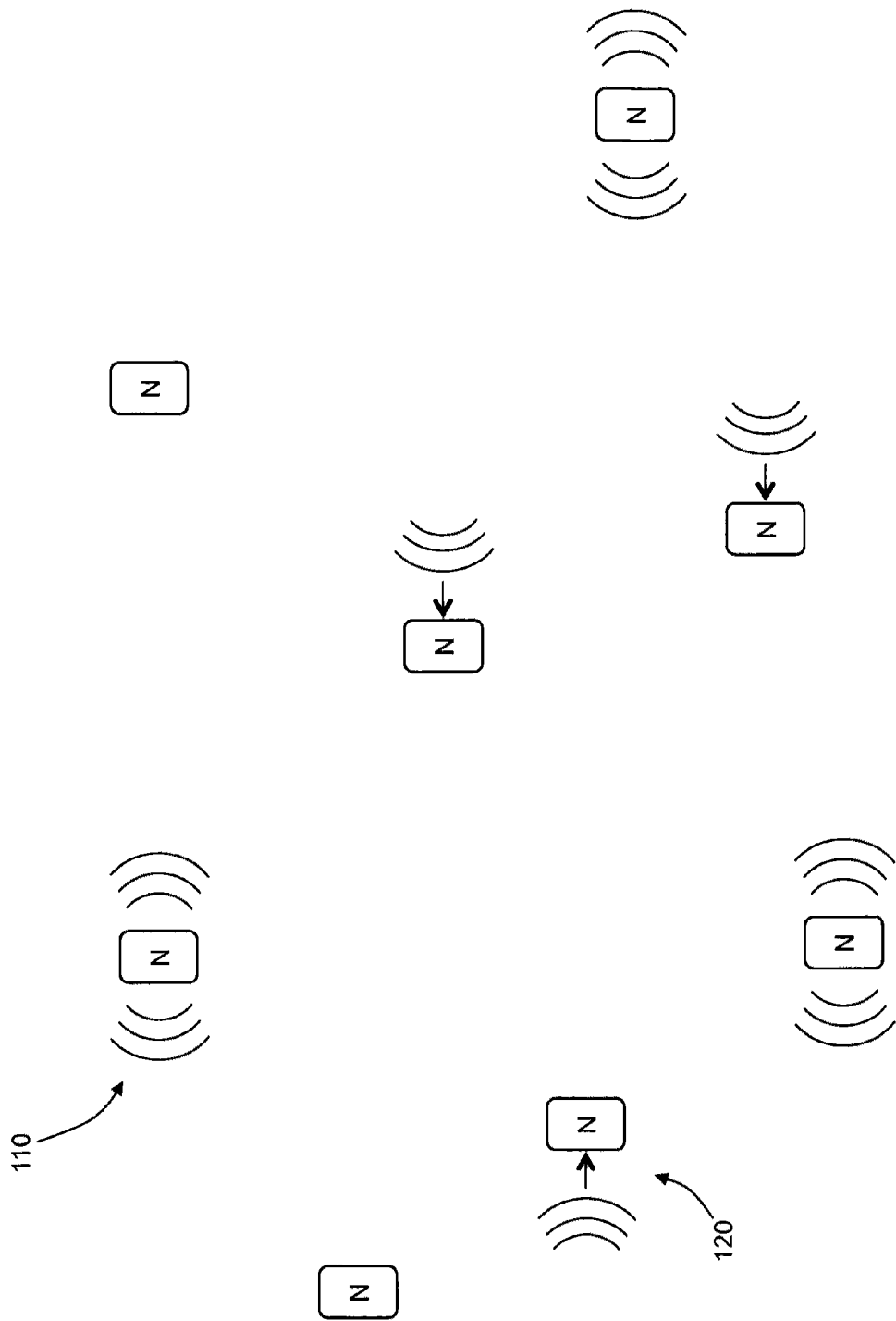
FIG. 1 shows an example of a plurality of wireless nodes communicatively connected through a broadcast-only network according to the present invention.

FIG. 1 shows an example of a distributed network of a plurality of wireless nodes N according to the present invention. The distributed network can include any number of nodes. Each of the nodes of the distributed network can broadcast 110 or receive 120 messages from its neighboring nodes. In a preferred embodiment, the nodes are wireless sensor and/or actuator nodes, or nodes without any sensor and/or actuator device. However, any device capable of bidirectional communication can be a node in the network. Though the present invention is suited for wireless networks, one or more wired nodes can also be members of the network.

Figure 2:
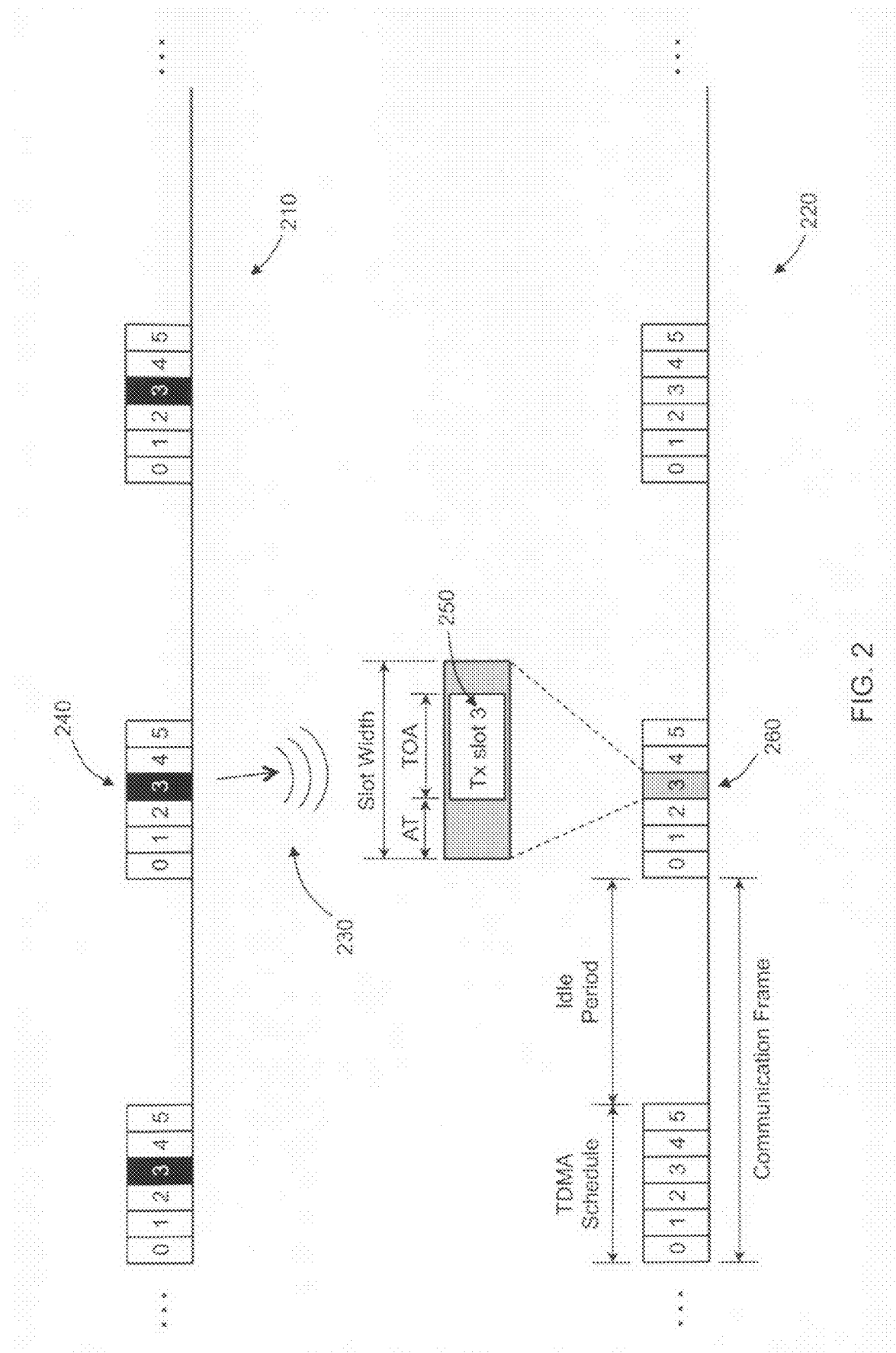
FIG. 2 shows an example of synchronized communication frames that include an active TDMA schedule with TDMA slots and an idle period according to the present invention.

At least some of the nodes are communicatively connected and communicate with the use of repeated communication frames. FIG. 2 shows a repeated communication frame of a broadcasting node 210 and a repeated communication frame of a listening node 220. Each communication frame includes an idle period and a time divisional multiple access (TDMA) schedule for active communication. The TDMA schedule includes a plurality of TDMA slots. A broadcast function is provided for each of the nodes to use one or more of the TDMA slots to broadcast messages. A listen function is also provided for each of the nodes to listen for and receive a broadcasted message. One or more TDMA slots are used to listen for and receive the broadcasted messages. For example, FIG. 2 shows a node broadcasting 230 a message through a TDMA slot 240 and another node receiving the broadcasted message in slot 260. Preferably slot 240 and slot 260 have the same slot number. Preferably, each of the broadcasted messages includes an identifier 250 of the TDMA slot used to broadcast the message. The identifier 250 can be a part of the MAC header of the broadcasted message.

Slot usage information can also be a part of the MAC header of the broadcasted message. The slot usage information includes information that a listen slot has received a message, that no message has been received from a neighboring node, and/or if a collision has been detected. The slot usage information can be used to prevent the hidden terminal problem. In an embodiment, each node does not broadcast any messages during one frame and evaluates the slot usage information of its neighbors in the next frame. By repeating this process over a randomized interval of frames, preferably from about 15 to 20 frames, the hidden terminal problem can be avoided.

It is important to note that the distributed network of the present invention does not require a central or beacon node coordinating the other nodes. Particularly, in a preferred embodiment of the present invention, none of the nodes in the network coordinates the TDMA schedule and the TDMA slots of another node of the network. The distributed functions for the nodes include network synchronization, TDMA schedule length and position, TDMA slot allocation, collision avoidance, and hidden-terminal avoidance. The broadcast function allows a node to transmit a message by a broadcast-only mechanism, which does not require an address of another node. The neighboring nodes have control over what to do with the broadcasted message. In other words, a neighboring node can decide to receive and process the message, to receive and discard the message, or use a provided ignore function to not listen for any broadcasted messages.

In a preferred embodiment, some of the nodes, a majority of the nodes, or all of the nodes in the network are approximately synchronized. Synchronized nodes have communication frames with time overlapping TDMA schedules to allow communication between nodes. In other words, overlapping TDMA schedules enable a message broadcasted from a TDMA slot of one node to be received by a TDMA slot of another node.

With a broadcast-only distributed communication system, the nodes can be extremely energy efficient. Moreover, by constraining the slot allocation of a TDMA schedule, the energy consumption is deterministic and therefore battery life and/or energy scavenging mechanisms become predictable. In addition, the distributed network of the present invention is also scalable, unlike existing centralized networks. Furthermore, in contrast to standard address-oriented message systems, the broadcast-only communication system of the present invention does not require CTS, RTS, or ACK messages or functions.

In an embodiment of the present invention, the communication frame of each of the nodes has a fixed length. The fixed length of the communication frame ranges between about 0.5 seconds and about 5 seconds, and is preferably about 1 second. In an alternative embodiment, the communication frame of each of the nodes has a variable length. A node may vary its communication frame length based on energy consumption and data throughput requirements. Shorter communication frames generally increase energy consumption, while allowing for greater data throughput.

Figure 3B:
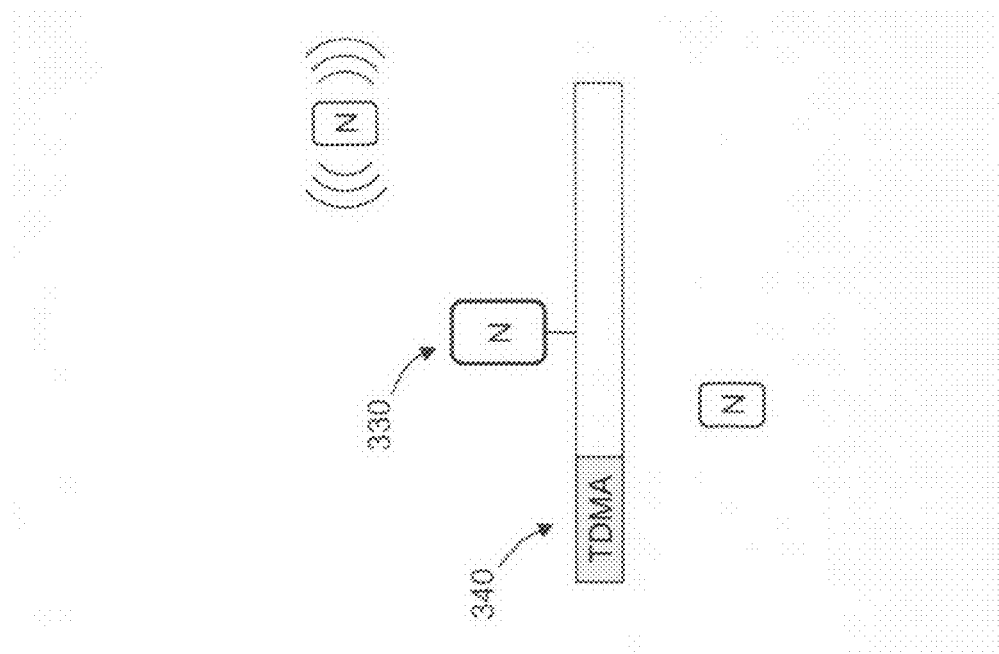
FIGS. 3A-3B show an example of a dynamic TDMA schedule length for a node based on the number of neighboring nodes according to the present invention.
Figure 3A:
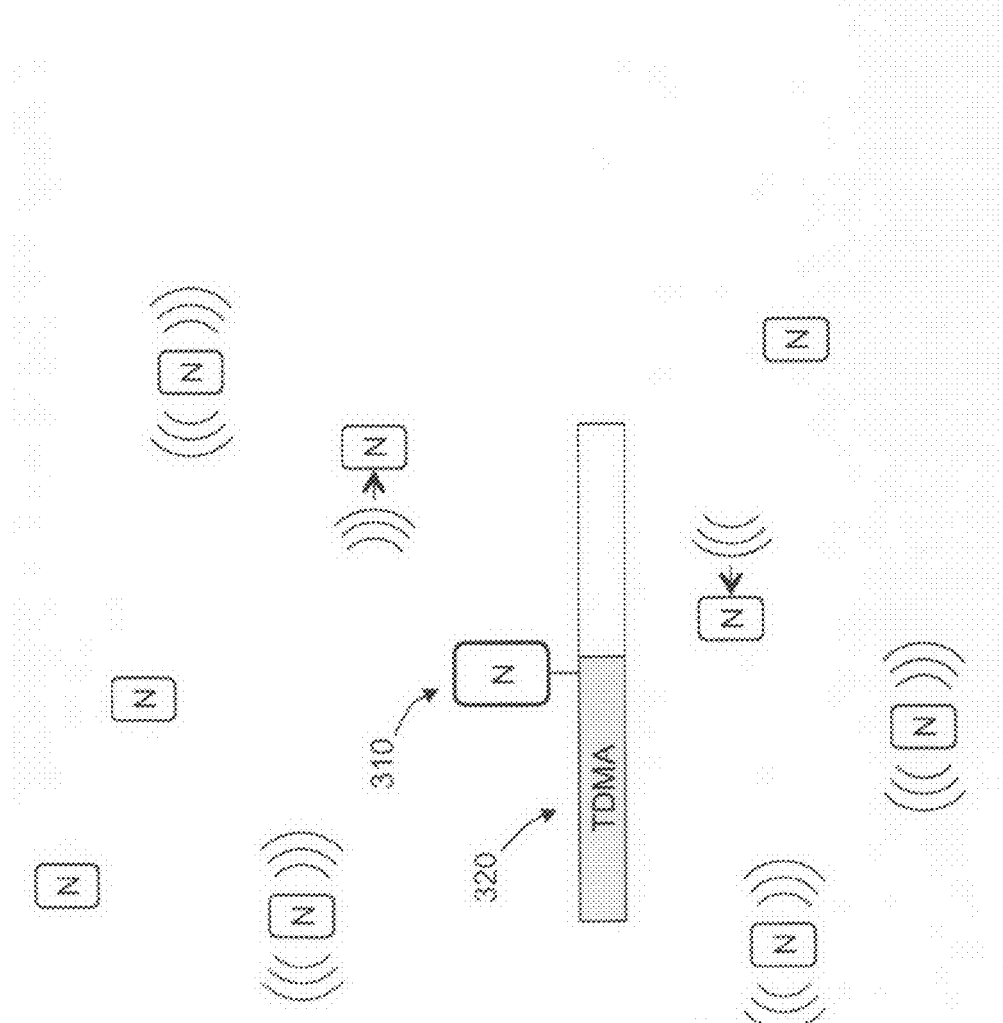

As mentioned above, each communication frame includes a TDMA schedule for active communication and an idle period, where little or no activity occurs. In an energy-efficient embodiment, the idle period is longer than the TDMA schedule. Preferably, the length of the TDMA schedule, defined by the number of TDMA slots, of a node can be changed. The change in length of the TDMA schedule can be based on the number of neighbors of the node. FIG. 3A shows an example of a node 310 with a large number of neighboring nodes. To avoid or minimize collisions, the node 310 increases its TDMA schedule 320 (i.e. increases the number of TDMA slots) to accommodate the large number of neighbors. FIG. 3B shows the opposite situation, in which a node 330 has only a small number of neighboring nodes, thus its TDMA schedule 340 is shorter than the TDMA schedule 320 of node 310.

In a preferred embodiment, each of the TDMA slots of the TDMA schedule is allocated to be a listen slot, a transmit slot, or an idle slot. Each of the nodes controls the allocation of its TDMA slots. When a TDMA slot is allocated for a specific function, the entire duration of the slot is dedicated for that same function. For example, in FIG. 2, the broadcasting node 210 has allocated TDMA slot 3 to be a transmit slot and the receiving node 220 has allocated TDMA slot 3 to be a listen slot. When two or more adjacent slots are allocated with the same function, a contiguous period occurs for that function. In a preferred embodiment, the allocation of TDMA slots is dynamic, where a node measures the usage of the TDMA slots by neighboring nodes and allocates the TDMA slots based on the measured usage of the TDMA slots, and/or the usage of the TDMA slots of the neighboring nodes, provided in the slot usage information provided in the header of each message.

It is important to note that the width of each of the TDMA slots is greater than a time-on-air TOA of each of the broadcasted messages. Having the TDMA slot width greater than the time-on-air allows the nodes to compensate for clock drifts between nodes and remain in communicative contact with other nodes. For each message received, an arrival time AT can also be measured upon reception of the message. The arrival time is the difference in time between the actual position of the received message and the beginning of the TDMA slot receiving the message.

In an embodiment, the time-on-air period is based on the data rate and the payload length. For example, data rates can range between about 250 kbps and about 2 Mbps, and payload lengths can range between about 32 bytes to 128 bytes. With these data rates and payload lengths, the time-on-air period ranges from about 300 µs to about 10 ms. In a preferred embodiment, the time-on-air period is about 300 µs and the TDMA slot width is about 800 µs.

Figure 4:
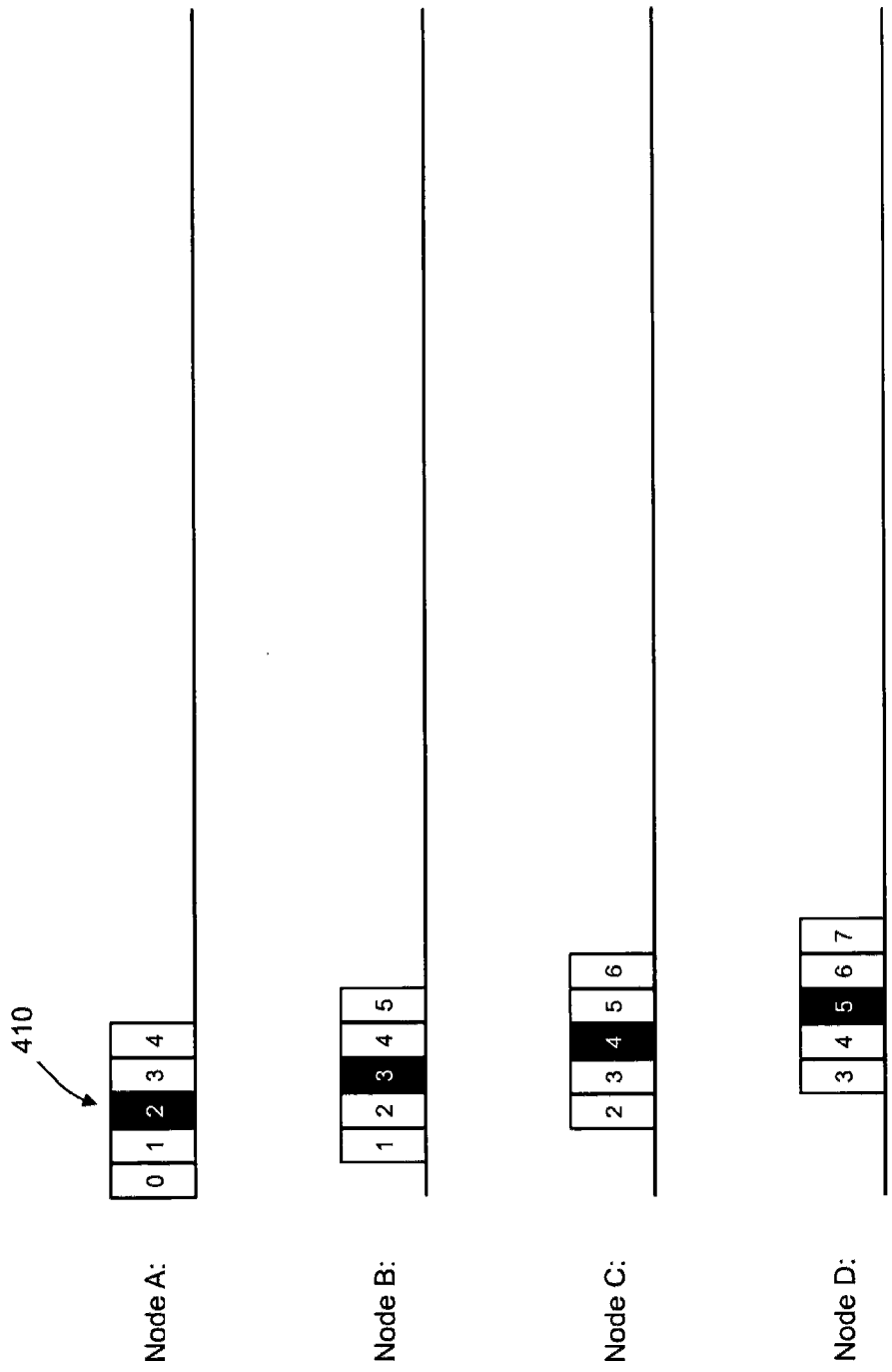
FIG. 4 shows an example of the communication frames of four nodes having swarm TDMA schedules according to the present invention.

In an embodiment, the TDMA schedule of each of the nodes can also be dynamic in position. FIG. 4 shows the communication frame for four nodes, A-D, capable of having a "swarm"-like behavior. The position of the TDMA schedules of each of the nodes is dependent on the positions of the TDMA of the neighboring nodes. In an exemplary embodiment, the TDMA schedule of each node has fixed number of slots with the middle slot 410 allocated to be a transmit slot. The transmitted messages can include slot usage information that the receiving nodes can use to adjust its TDMA schedule position. With the swarm-like TDMA schedules, as represented in FIG. 4, the nodes have symmetrical communication properties with its neighbors. The constant TDMA schedule length allows for a known energy consumption and predictable battery life of nodes.

Figure 5:
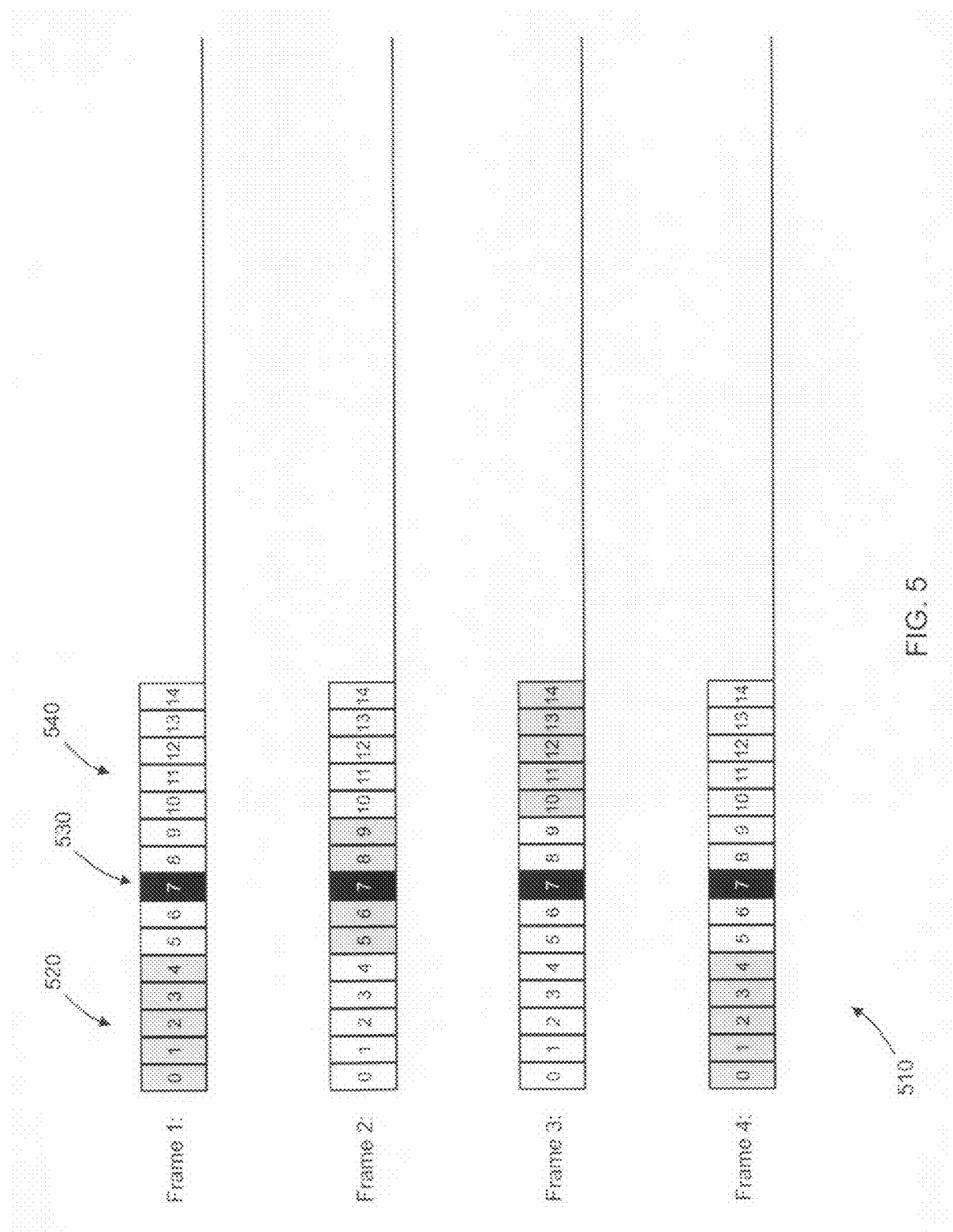
FIG. 5 shows an example of consecutive communication frames of a single node having a cluster TDMA schedule according to the present invention.

Embodiments of the present invention can include dynamic allocation of the TDMA slots. FIG. 5 shows four consecutive communication frames of a single node having a cluster TDMA schedule 510. Under the cluster TDMA schedule scheme, the TDMA schedule length of a node is rounded to a multiple of a cluster length. Only one cluster is active per communication frame, as represented by the shaded TDMA slots 520 in FIG. 5. The TDMA slots of the active cluster can be allocated to be listen slots, whereas the TDMA slots not in the active cluster can be allocated to be idle slots 540. The node schedules the next cluster to be active in the next communication frame. In an embodiment, while the clusters are scheduled over the frame, the transmit TDMA slot 530 remains at the same position. Though the cluster length is shown to be 5 TDMA slots in FIG. 5, any cluster length can be employed. The use of a cluster TDMA schedule allows a node to receive messages from many neighbors, distributed over time using multiple frames. In addition, the energy consumption remains constant and is independent of the number of neighbors.

In another embodiment of the present invention, communication between nodes in a crowded environment can rely on a constant length TDMA schedule with transmit slot skipping. The TDMA schedule length can be determined based on available energy and required data throughput with the neighboring nodes. The transmit TDMA slot allocation can be based on slot usage information of the node itself and/or the slot usage information of the neighboring nodes. Transmit slot skipping is activated when there are more neighbors than available TDMA slots in the TDMA schedule. In such a circumstance, a node will decide to skip a transmission in one or more frames. The transmit TDMA slot is temporarily allocated to be a listen slot to receive messages from the neighbors using the same slot during the one or more frames. With transmit slot skipping, the node is capable of communicating with other nodes in a crowded environment without having to add TDMA slots, thereby maintaining low energy consumption.

Communication between nodes in the distributed network requires the communication frames of the nodes to be approximately synchronized. More generally, communication is possible when the TDMA schedules of communicating nodes at least partially overlap. Node synchronization exists when the communication frames of communicating nodes start at approximately the same time. Synchronization is difficult to maintain due to clock drift. In an embodiment of the present invention, each node can occasionally or periodically update its communication frame start time to stay approximately synchronized with the rest of the network. It is important to note that this update does not require communications with a central time-keeping node.

Figure 6:
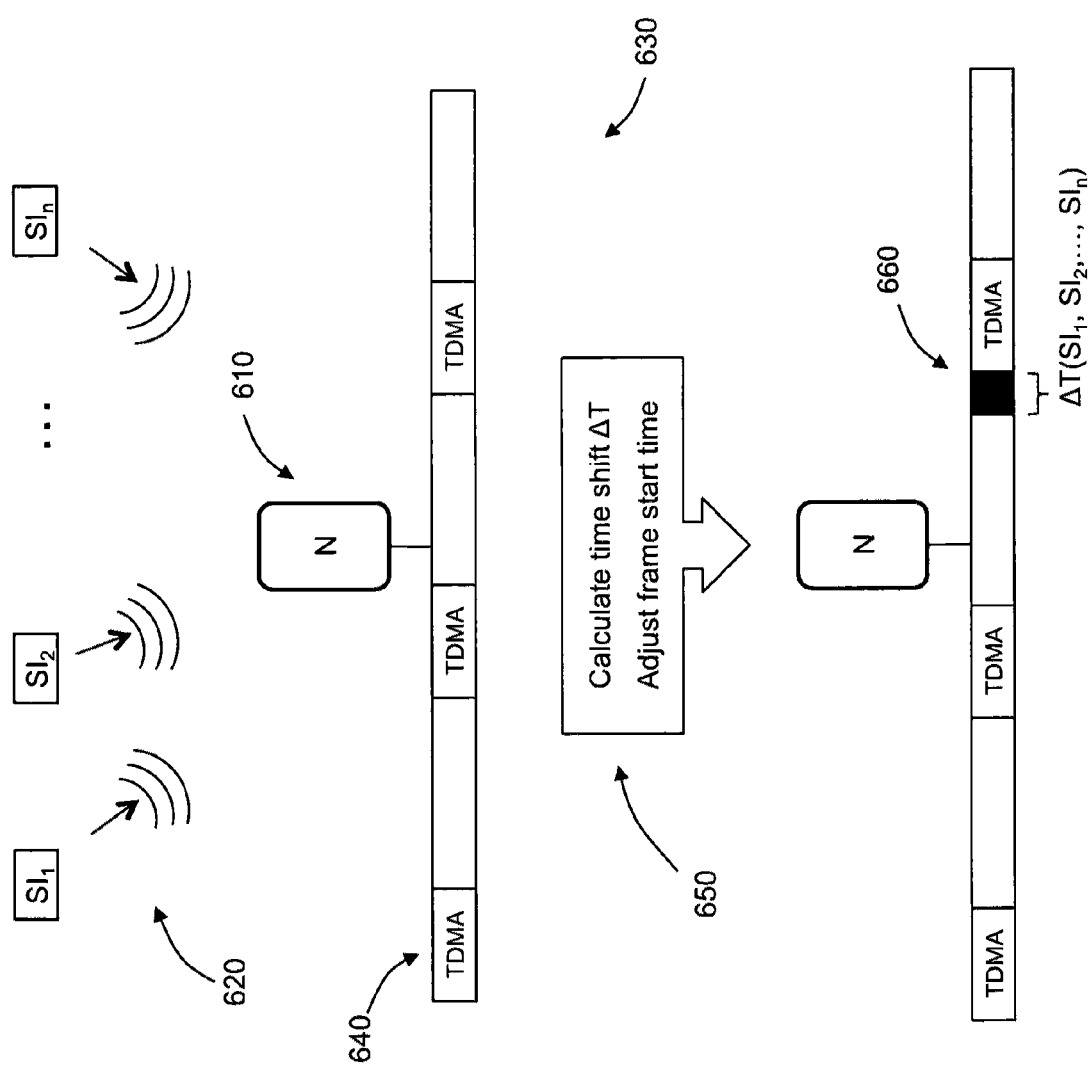
FIG. 6 shows an example of determining the start time of a communication frame of a node based on received messages according to the present invention.

FIG. 6 shows a node 610 determining the start time for its repeated communication frame 630 and the TDMA schedule 640. Node 610 receives one or more broadcasted messages 620 from its neighbors. The broadcasted messages 620 include slot identifiers $SI_1$-$SI_n$, for identifying the TDMA slots used to transmit the broadcasted messages 620. A time shift $\Delta T$ is calculated 650 based at least partially on the received slot identifiers $SI_1$-$SI_n$. The time shift $\Delta T$ is used to determine and adjust the start time 660 of the communication frame 630. The adjustments to the communication frame start time 660 help to prevent the loss of synchronization of a node with the rest of the network due to drift in the node's internal clock. In another embodiment, a node measures the arrival times of the received messages in addition to the slot identifiers $SI_1$-$SI_n$, and calculates the time shift $\Delta T$ based on the arrivals times and the slot identifiers $SI_1$-$SI_n$.

The time shift calculation can involve any calculus that mitigates the effects of clock drift. Example time shift calculations include taking the average or median of the slot identifiers and/or arrival times. In an embodiment, the time shift uses the following calculation: $\Delta T = G * \text{median}[\delta T(Rx_1), \delta T(Rx_2), \ldots, \delta T(Rx_n)]$, where G is a gain factor and $\delta T(Rx_i)$ is the difference between the expected arrival time and the actual arrival time of the $i^{th}$ received message. The gain factor G preferably ranges between 0.5 and 1, and is typically 0.75.

Though FIG. 6 shows an adjustment of the communication frame start time based on received messages, there are circumstances when a node cannot communicate with any of the other nodes in the network, i.e. the active TDMA schedule of the node does not overlap with the TDMA schedule of any of the neighboring nodes. For example, loss of synchronization can arise when a node is isolated from the rest of the network for a sufficiently long time for its TDMA schedule to drift away. When the isolated node attempts to rejoin the network and communicate with the other nodes, it fails due to the non-overlapping TDMA schedules.

Figure 7:
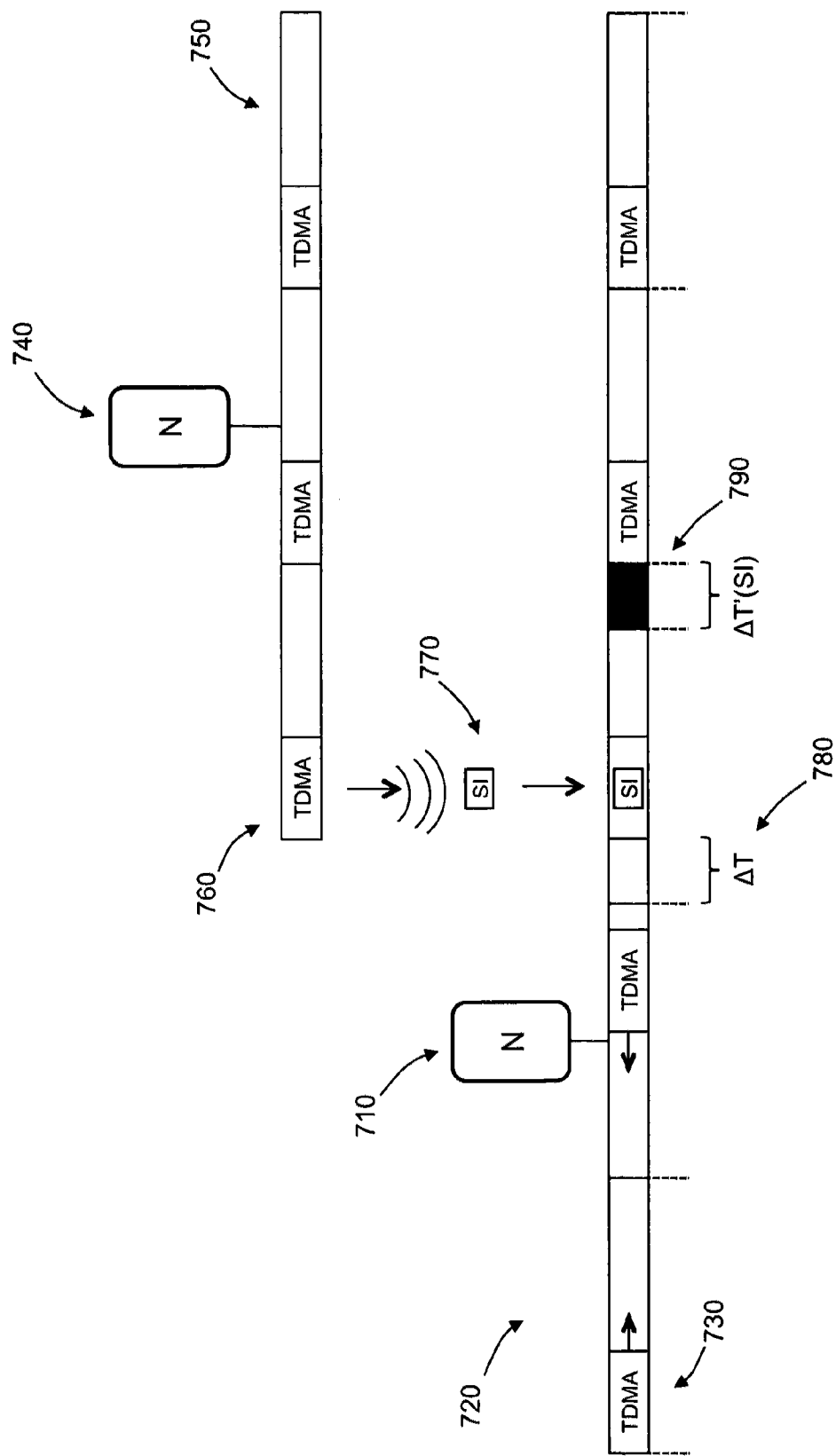
FIG. 7 shows an example of a search function allowing a node to change a property of its communication frame to search for another node according to the present invention.

FIG. 7 shows an example search function for a node 710 to find one or more other nodes in the network. The node 710 activates the search function only if it has not received any broadcasted messages during a number of consecutive communication frames 720. In an embodiment, the number of consecutive communication frames to activate the search function is about 30. When the communication frame length is one second, this corresponds to half a minute of having no communication before a nodes enters the search mode. When activated, the search function allows the node to change one or more properties of its communication frame, including the start time of the communication frame, the length of the communication frame, the position of said TDMA schedule in the communication frame, the length of the TDMA schedule, the position of the idle period in the communication frame, the length of the idle period, or any combination thereof.

In FIG. 7, node 710 is in search mode and moves the position of its TDMA schedule 730 until the TDMA schedule 730 overlaps with a TDMA schedule 760 of a neighboring node 740. Enabled by the overlap in the TDMA schedules, node 710 can potentially receive a message 770 broadcasted by the neighboring node 740. The broadcasted message 770 can include the slot identifier SI and/or a measured arrival time. The received message along with the known moved position $\Delta T$ of the TDMA schedule 730 during searching can be used to synchronize node 710 with node 740. Once in communication with another node, the search function is deactivated.

In another embodiment of the present invention, a node operating the search function performs the following steps: (1) Increase the communication frame length from T(idle)+T(TDMA) to T(idle)+2*T(TDMA), where T(idle) is the length of the idle period and T(TDMA) is the length of the TDMA schedule. (2) Search with the communication frame length of step (1) for [T(idle)+T(TDMA)]/T(TDMA)+1 cycles. (3) Decrease the communication frame length to T(idle) for the same number of cycles as in step (2). The node will repeat steps (1)-(3) until it receives a message from a neighboring node. After the message is received, the searching node approximately synchronizes with the node that broadcasted the received message. The communication frame length is reset back to T(idle)+T(TDMA) after the search is successful.

Figure 8:
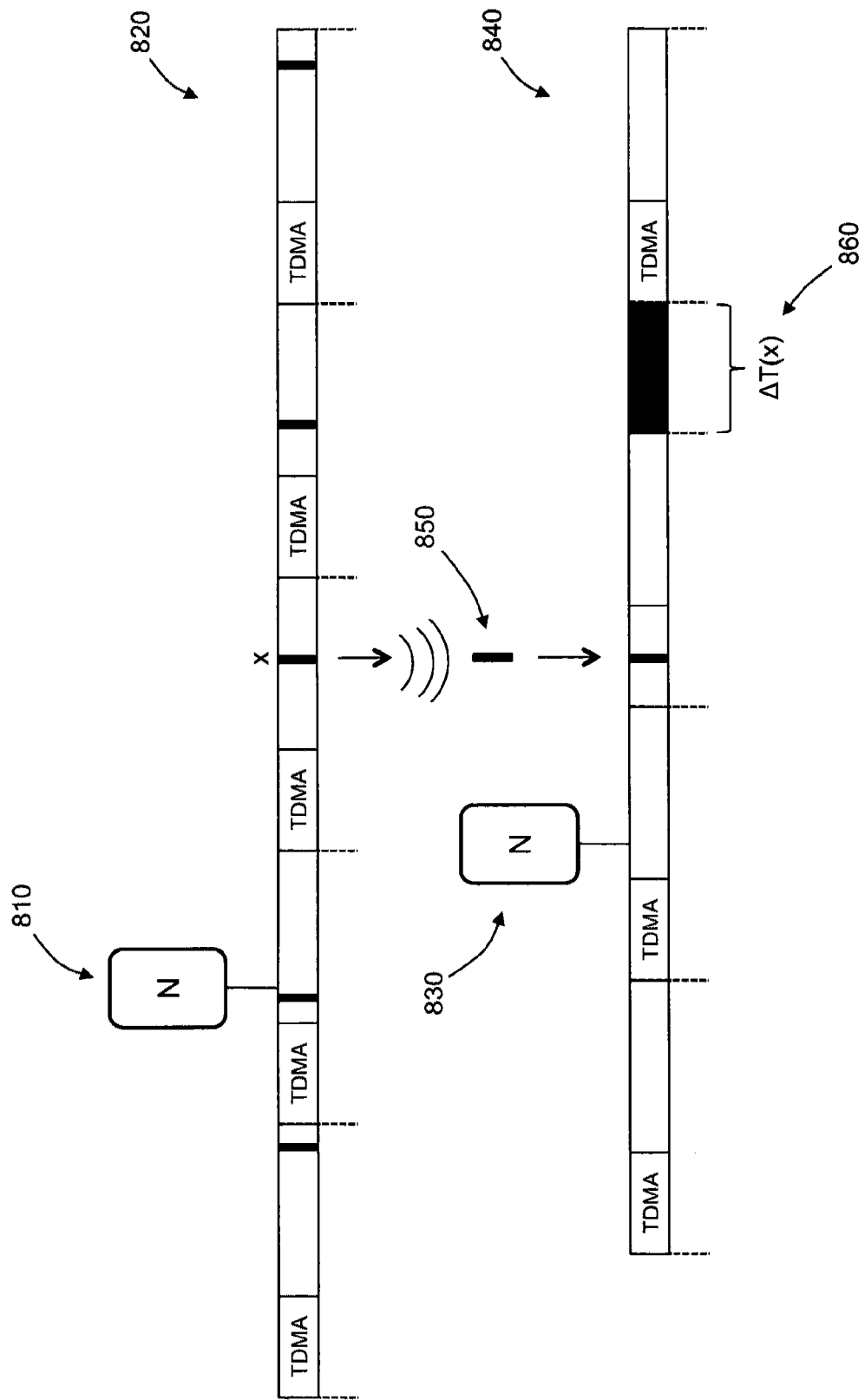
FIG. 8 shows an example of a join function allowing a node to broadcast a join message from a random position according to the present invention.

In a preferred embodiment of the present invention, a join function is provided to the nodes of the distributed network for synchronization of nodes. FIG. 8 shows an example of the join function for synchronizing the communication frame 840 of node 830 to the communication frame 820 of node 810. When operating the join function, node 810 transmits a join message from a random position in the idle period of each communication frame 820. By a stochastic process, one of the join messages 850 transmitted from a random position x will overlap with a TDMA schedule of the communication frame 840 of another node 830. The join message 850 includes the random position x. In an embodiment, the join message 850 does not include any other information other than the random position x. Upon reception of the join message 850, node 830 can shift its TDMA schedule by a time shift $\Delta T(x)$ to approximately synchronize node 830 to node 810. The time shift $\Delta T(x)$ is at least partially based on the random position x.

In a preferred embodiment, each node transmits a join message during every communication frame. Since the join message is transmitted from the idle period, when nodes are in synchronization, the join messages have no effect. Preferably, nodes with activated search functions do not transmit join messages.

The join function, as described above, allows for an energy efficient and scalable process for node synchronization. The join function can be used in circumstances in which the search function is not applicable. For example, when a plurality of nodes is subdivided into two or more groups with intra-group synchronized members, the search function will not be activated because there is no reason to begin searching when the members are already intra-group synchronized. Without operating the join function, inter-group communication is not possible and the groups will remain isolated from one another. When the join function is utilized, the multiple groups will eventually merge into one or a small number of groups. This merging of groups is accomplished in an undirected manner. In practice, a smaller group will likely synchronize to a larger group simply because the larger group has more join messages to broadcast than the smaller group.

Part II: Monitoring Wireless Networks

Monitoring the behavior and status of a wireless network can be a daunting task, particularly for large networks. Existing network monitoring techniques that rely on direct connections between a node and a computer are impractical for large networks. Furthermore, the connections are typically intrusive to the network and can cause large energy losses to the nodes to be monitored. As nodes of wireless networks are typically battery-operated, energy inefficiencies for monitoring affect the longevity of the nodes to perform their purpose. The present invention is directed to minimally-intrusive and energy efficient monitoring of wireless networks, including large wireless sensor networks.

Figure 9:
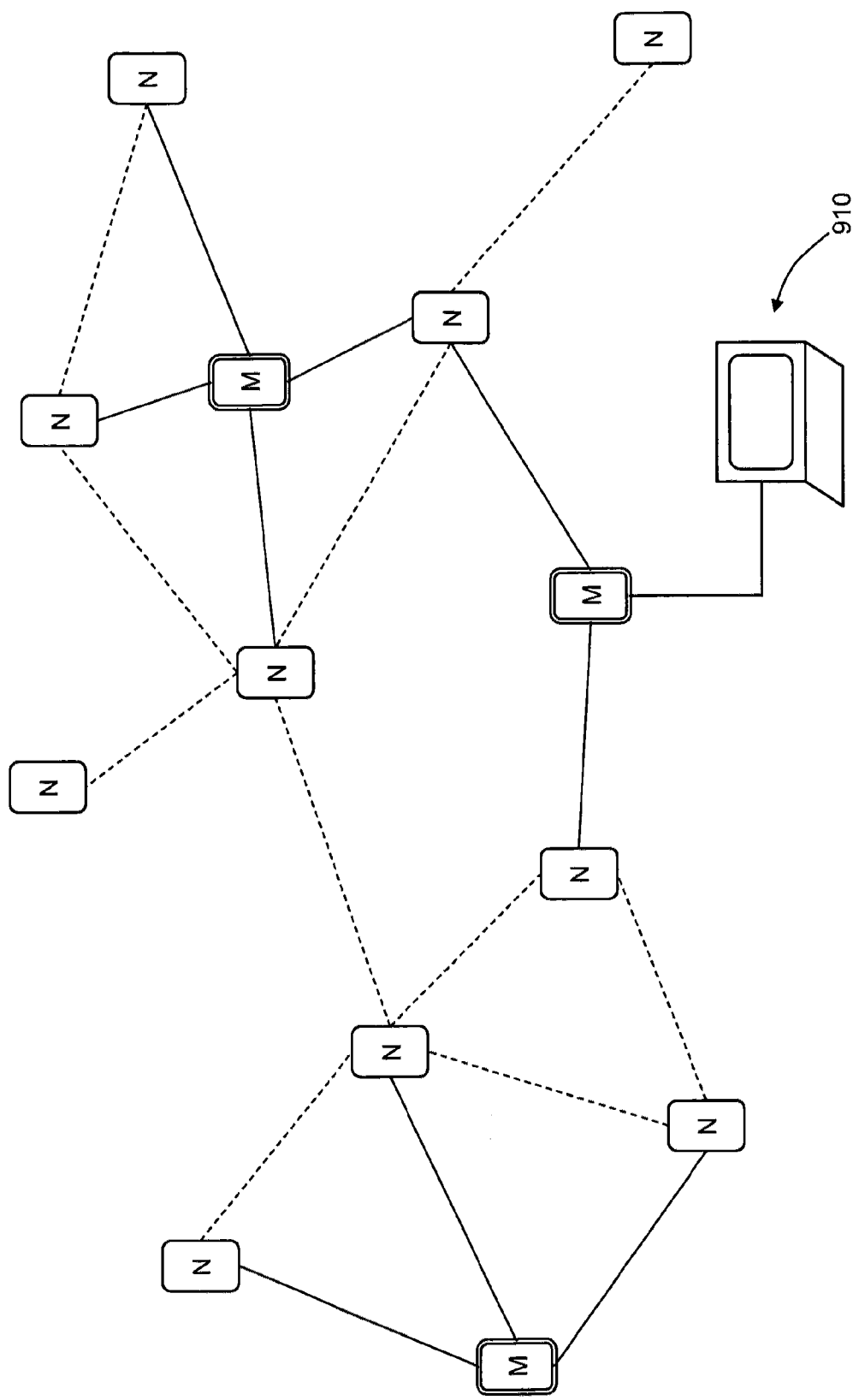
FIG. 9 shows an example of a wireless network of operational nodes N embedded with monitoring nodes M according to the present invention.

FIG. 9 shows an example wireless network of a plurality of operational nodes N, wherein the network is embedded with one or more monitoring nodes M. The operational nodes N can be deployed for any application, such as in industrial, manufacturing, military, agricultural, and communications applications, and can include device functionalities as would be appreciated by one of ordinary skill in the art. In a preferred embodiment, the operational nodes N include sensor devices or actuator devices, and the wireless network is a wireless sensor network (WSN). To form a wireless network, at least some of the operational nodes N must be communicatively connected. The dashed lines shown in FIG. 9 represent the connections from one operational node N to another. In a preferred embodiment, the operational nodes N communicate with each other through a broadcast-only communication system as described in U.S. patent application Ser. No. 12/215,040 filed Jun. 23, 2008 and in Part I. However, it is noted that the operational nodes N can also use other communication systems for inter-node communication, as would be appreciated by one of ordinary skill in the art, including unicast and address-specific communication systems, or a combination of broadcast and unicast systems. Irrespective of the methods or protocols for communication between operational nodes, in Part II messages sent and received from one operational node N to another are referred to as operational messages.

The present invention is directed to communicatively connecting one or more monitoring nodes M to one or more of the operational nodes N for monitoring the network. The solid lines shown in FIG. 9 represent communicative connections between operational nodes N and monitoring nodes M. Connections between operational nodes N and monitoring nodes M allow the operational nodes N to send state information related to the current behavior or state of the operational node, a local neighborhood of the network, or the entire network to be received by a monitoring node M.

FIG. 9 also shows a computing device 910, such as a laptop, connected to one of the monitoring nodes M. Connections between a computing device 910 and a monitoring node M allow the monitoring node M to transmit the collected state information for analysis. It is noted that analysis of the behavior and status of the operational nodes can be accomplished by the monitoring node, by the computing device 910, or by another device. In an embodiment, the computing device 910 also supplies power to the monitoring node M connected to it. Because the computing device 910 generally has a large power supply or is connected to a large power supply, by having access to this power supply, the monitoring node M does not have restrictive power constraints.

Figure 10:
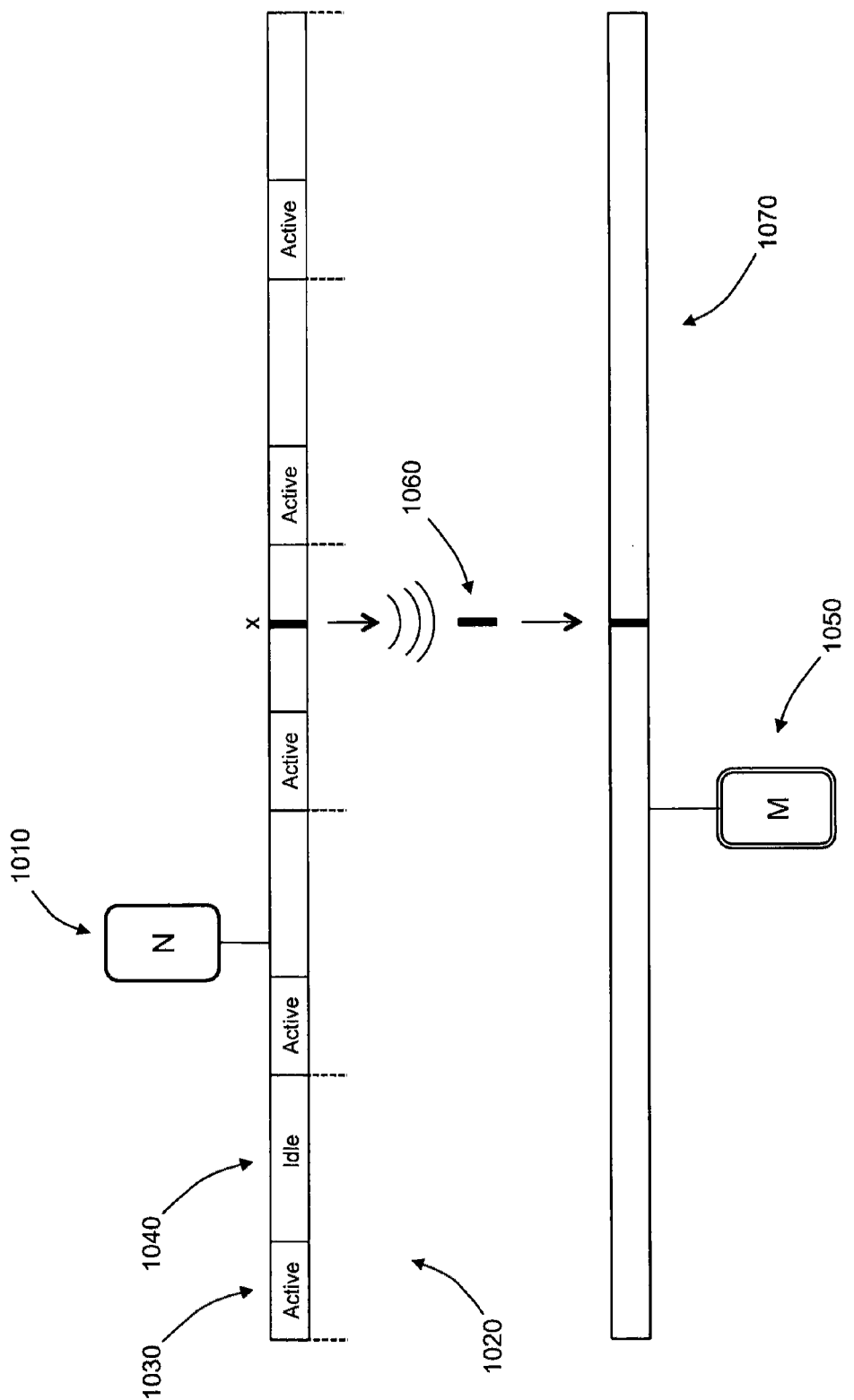
FIG. 10 shows an example of an operational node N transmitting a state message to be received by a monitoring node M according to the present invention.

FIG. 10 shows an example of an operational node 1010 sending a state message 1060 with state information to a monitoring node 1050. In an embodiment, the monitoring node 1050 continually listens for state messages from operational nodes that are communicatively connected to it. Box 1070 of FIG. 10 represents the constant availability of monitoring node 1050 to receive state message 1060. Continual listening causes a large power demand, which may not be met by operational node 1010. However, such restrictions may not be applicable to monitoring node 1050, particularly if the monitoring node 1050 is supplied with power from a computing device as described above.

The repeated communication frame 1020 of operational node 1010 is also shown in FIG. 10. The repeated communication frame 1020 can be used for communication with other operational nodes, such as by sending and receiving operational messages. Communication between operational nodes can be through any media access control (MAC) protocol, including, but not restricted to, the MAC described in U.S. patent application Ser. No. 12/215,040 filed Jun. 23, 2008 and in Part I. In a preferred embodiment, the repeated communication frame 1020 includes an active period 1030 and an idle period 1040. The active period 1030 is used to communicate with other operational nodes by sending and receiving operational messages. In an embodiment, the active period 1030 includes a time division multiple access (TDMA) schedule with a plurality of TDMA slots. By communicating only during the active period 1030 and remaining inactive during the idle period 1040, operational node 1010 can conserve energy. In contrast to monitoring nodes, conservation of energy is an important consideration for operational nodes as their power supplies are typically limited to their onboard batteries. For energy considerations, the idle period 1040 can be much longer than the active period 1030.

In an embodiment, the state message 1060 is transmitted during the idle period 1040 of the communication frame 1020 of operational node 1010. Transmission during the idle period 1040 would not interfere with the communications sent and received during the active period 1030. Preferably, the state message transmitted by operational node 1010 is not received by another operational node and is only received by one or more monitoring nodes. In an embodiment, the state message 1060 is broadcasted from operational node 1010 without addressing the state message 1060 to a particular monitoring node.

It is important to note that the state message 1060 is preferably transmitted at a random position x in the idle period 1040. In an embodiment, state messages are sent in multiple frames and the random position x changes from frame to frame of the repeated communication frame 1020. By using a random position x in the idle period 1040, the state message 1060 is less likely to interfere with communications between operational nodes. Since monitoring node 1050 is capable of continuous listening, it can receive the state message 1060 irrespective of the random position x. In another embodiment, the state message 1060 is included in the join message 850, shown in FIG. 8. For such an embodiment, the transmission of state information does not increase the energy cost of the operational node as the join message 850 is already being transmitted. In another energy efficient embodiment, the state message is a short message with a length and time on air that is just sufficient to contain the state information. In other words, the state message does not contain a lengthy preamble period or other transmission overhead.

One or more state transmit functions are provided for allowing the operational nodes to transmit the state messages. It is noted that an operational node can transmit any number of state messages, each of the state messages can have the same or different state information. Similarly, one or more state receive functions are provided for allowing the monitoring nodes to receive the transmitted state messages.

State information contained in the state message 1060 can include any type of information that may be useful for monitoring the status and behavior of the operational nodes or any part of the wireless network, or can be useful to debug the network. State information can include a node identifier, a slot allocation, a number of collisions, a local energy supply, a number of neighbors, a state of the MAC, synchronization information, a reception level, a reception quality, and a current random number. Other state information can include one or more states of the software running in the operational node, such as memory occupation (e.g. FIFO-levels), array sizes, pointers in an array, variable values etc. State information can also include values of sensors connected to the operational node (e.g. temperature, light level, position, vibration, electromagnetic measurements, gas flow, liquid flow, presence or absence of persons and/or goods, open/close states of window and doors, etc.) or values of actuators (e.g. visual displays and/or lamps, audio actuators, speakers, buzzers, alarms, etc.). State information included in state messages is not restricted to the above and can include additional items as would be appreciated by one of ordinary skill in the art.

Figure 11:
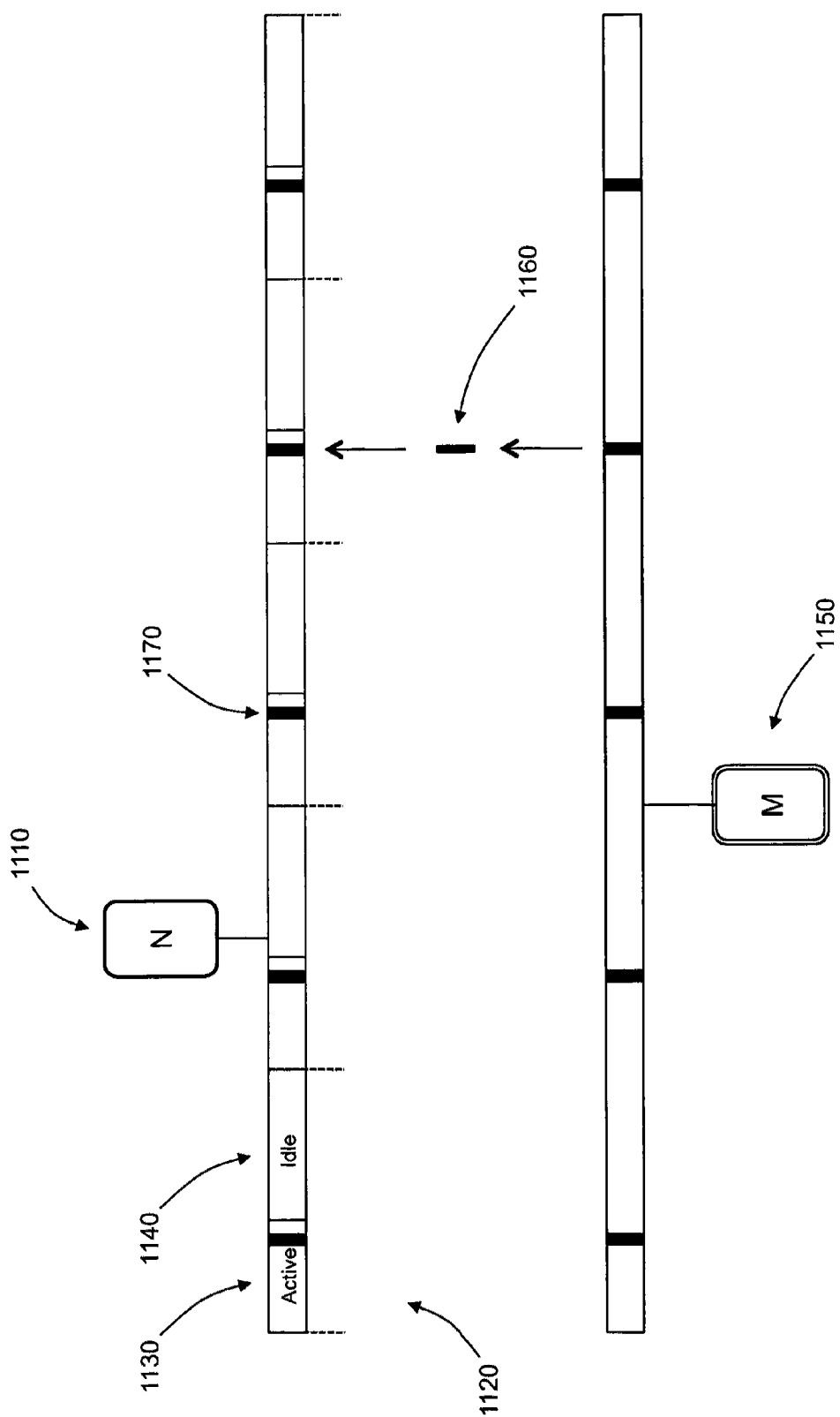
FIG. 11 shows an example of a feedback function allowing a monitoring node M to send feedback to an operational node N according to the present invention.

Embodiments of the present invention are also directed to influencing the behavior of operational nodes. A feedback function is provided for allowing one or more monitoring nodes to send feedback to one or more operational nodes. FIG. 11 shows monitoring node 1150 transmitting a feedback message 1160 to operational node 1110. In an embodiment, the feedback message 1160 includes instructions for operational node 1110 to change its behavior. Instructions can be related to the position of the operational node 1110, the communication frame of the node (e.g. for synchronization purposes), or any instruction that may be useful to operational node 1110.

In an embodiment, a dedicated feedback channel is provided for one or more of the monitoring nodes to transmit feedback to one or more of the operational nodes. In an embodiment, different feedback channels can be dedicated for different operational nodes. Alternatively, all of the operational nodes can dedicate the same communication channel for receiving feedback from the monitoring nodes. FIG. 11 shows the repeated communication frame 1120 of operational node 1110 and the active 1130 and idle periods 1140 of the communication frame 1120. In an embodiment, the active period 1130 includes multiple TDMA slots for communication, wherein one of the slots 1170 is dedicated for receiving feedback messages 1160. As shown in FIG. 11, monitoring node 1150 transmits the feedback message 1160 at times corresponding to the dedicated slot 1170.

Figure 12:
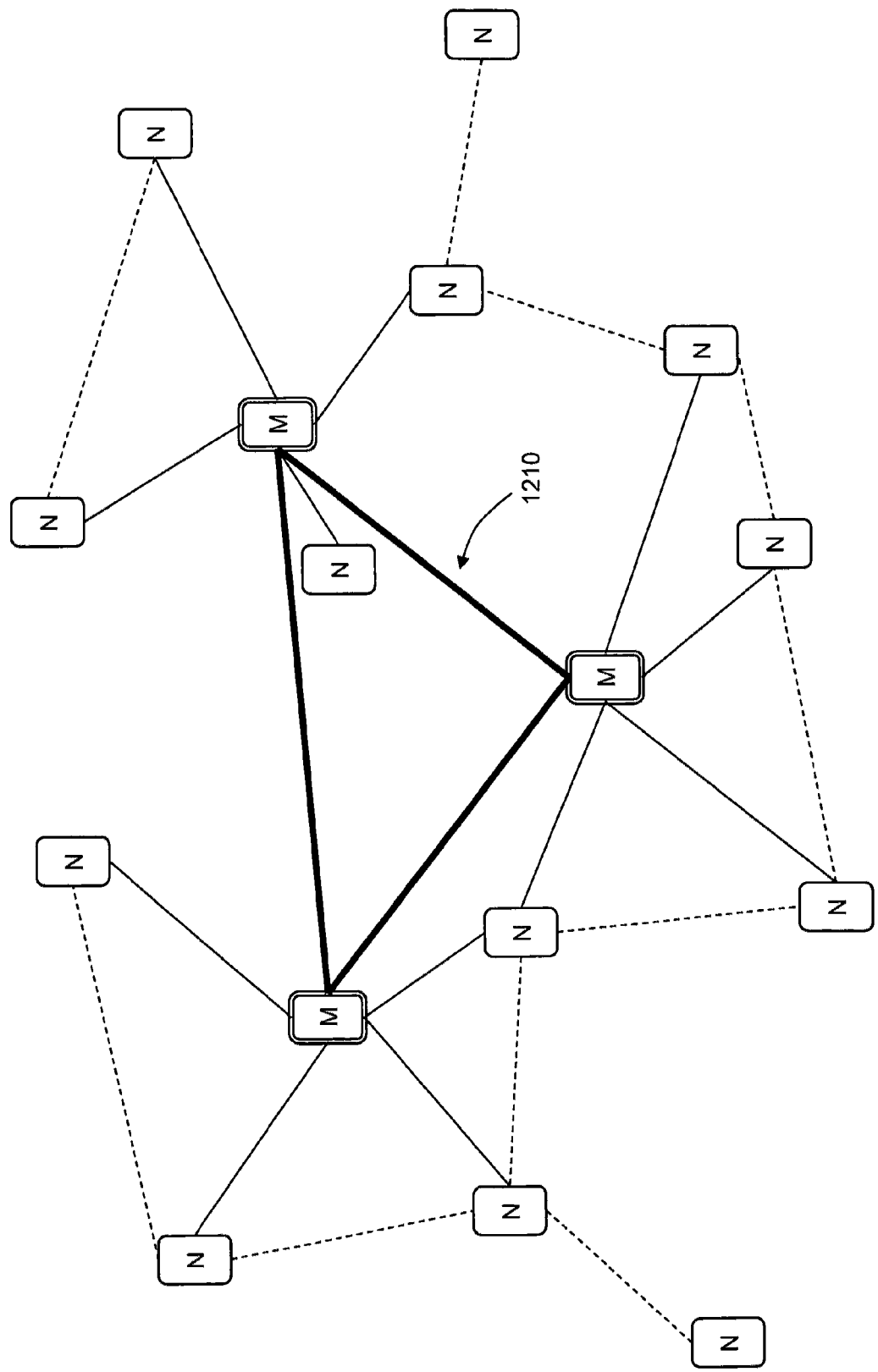
FIG. 12 shows an example a wireless network of operational nodes N embedded with a plurality of interconnected monitoring nodes M according to the present invention.

FIG. 12 shows an example of a wireless network having a plurality of operational nodes N and a plurality of monitoring nodes M. As in FIG. 9, the dashed lines represent connections between operational nodes N, and the thin solid lines represent connections between operational nodes N and monitoring nodes M. The thick solid lines 1210 in FIG. 12 represent communicative connections from one monitoring node M to another. In an embodiment, connections between monitoring nodes M can be used for correlating the state information received by the connected monitoring nodes M. Correlated state information can be used for correlated analysis of the operational nodes N and of the wireless network.

Figure 13:
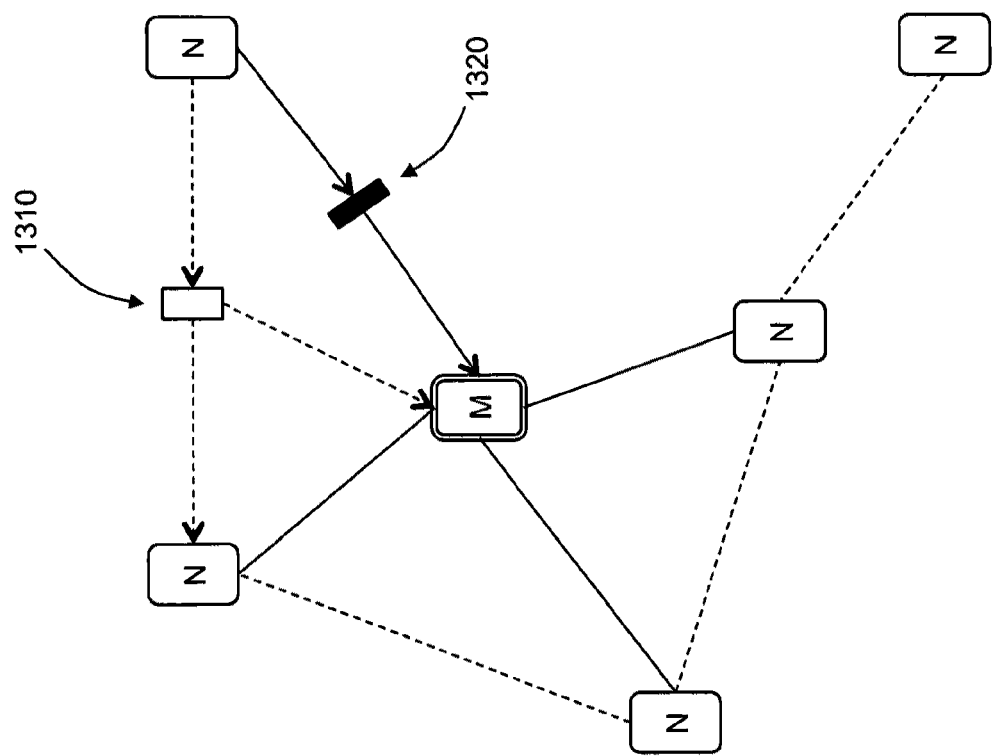
FIG. 13 shows an example of an intercept function allowing a monitoring node M to intercept operational messages sent between operational nodes N according to the present invention.

In an embodiment, an intercept function is provided for allowing a monitoring node M to intercept operational messages 1310 sent between operational nodes N. Information contained in an intercepted operational message 1310 can be correlated with state information from a state message 1320. In an embodiment shown in FIG. 13, a state message 1320 is associated with an intercepted operational message 1310, wherein the same operational node transmits both the state 1320 and the operational 1310 messages. The association of the state message 1320 with the operational message 1310 can be used to analyze the behavior of the operational node transmitting the state 1320 and the operational 1310 messages.

In an embodiment, the monitoring node M is capable of intercepting operational messages 1310 and providing feedback messages (e.g. the feedback message 1160 in FIG. 11) to the operational node N for influencing the behavior of the operational node N. By intercepting operational messages 1310, the monitoring node M can determine if the operational node N has complied with the feedback message 1160. In an embodiment, after the operational node N has confirmed compliance with the feedback message 1160 (e.g. by changing its state or behavior according to instructions provided in feedback message 1160), the monitoring node M can halt transmission of the feedback message 1160. Similarly, compliance with a feedback message can be checked using a state message 1320 in addition to or in replacement of the intercepted operational message 1310.

Figure 14B:
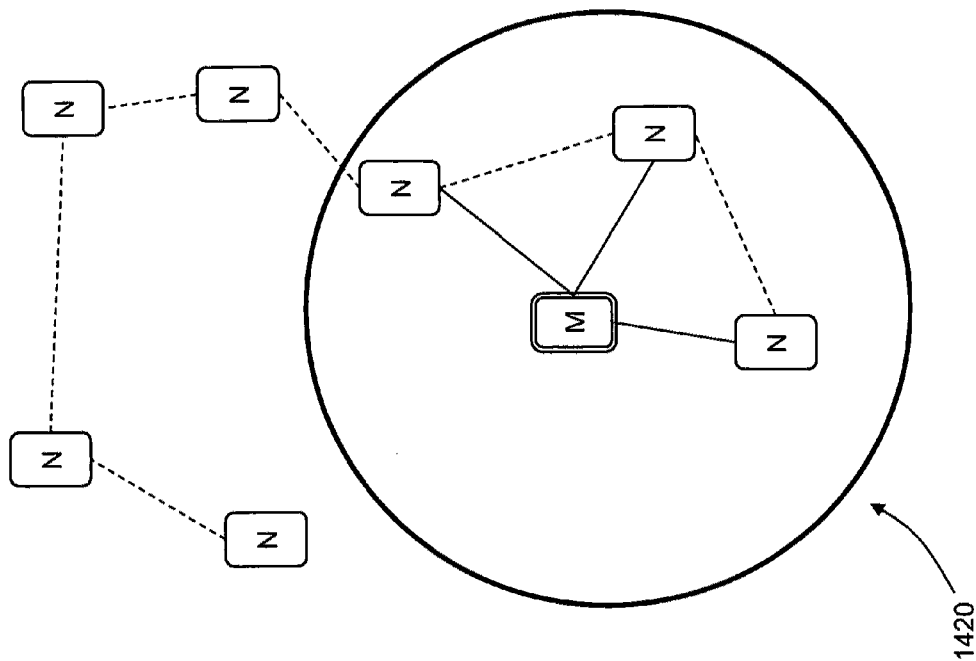
FIGS. 14A-B shows an example a moveable monitoring node M for monitoring multiple regions of a wireless network of operational nodes N according to the present invention.
Figure 14A:
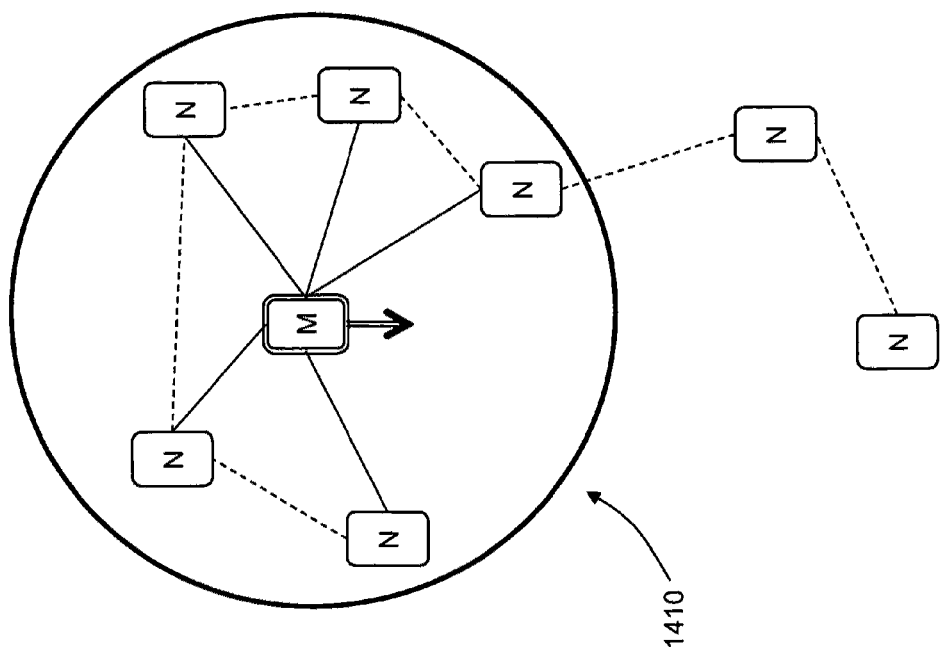

FIGS. 14A-B show an embodiment of the present invention having a moveable monitoring node M for monitoring the behavior and status of multiple regions of the network. FIGS. 14A-B show the monitoring node M in a first region 1410 of the network and moving to a second region 1420. A moveable monitoring node M can monitor a larger part of the wireless network. It is noted that the operational nodes N can also be moveable.

As one of ordinary skill in the art will appreciate, various changes, substitutions, and alterations could be made or otherwise implemented without departing from the principles of the present invention, e.g. other wired and/or wireless devices can be members of the network, including data storage devices, and the network can be deployed for any application. Accordingly, the scope of the invention should be determined by the following claims and their legal equivalents.

What is claimed is:

1. A system for monitoring behavior and status of a wireless network, said system comprising:
    (a) a plurality of operational nodes, wherein at least some of said operational nodes are wirelessly connected for communication, wherein said operational nodes use repeated communication frames for said communication, and wherein each of said communication frames comprises:
        (i) a first period which is an active period, wherein said operational nodes communicate with each other through one or more operational messages sent and received in said active period; and
        (ii) a second period, wherein little or no activity occurs in said second period;
    (b) one or more monitoring nodes, wherein at least one of said monitoring nodes is communicatively connected to at least one of said operational nodes,
    wherein one or more of said operational nodes transmits a state message to be received by said monitoring nodes, wherein said state message comprises state information of said operational node transmitting said state message, wherein said state message is transmitted in said second period of said communication frame,
    wherein at least one of said monitoring nodes receives at least one of said state messages transmitted by said operational nodes, and wherein said state messages are for monitoring said operational nodes.

2. The system as set forth in claim 1, wherein said state message is transmitted in a random position of said second period of said communication frame.

3. The system as set forth in claim 1, wherein said operational nodes communicate with each other through a broadcast-only communication system, and wherein each of said operational messages broadcasted by each of said operational nodes does not comprise an address of another of said operational nodes.

4. The system as set forth in claim 1, wherein said state message transmitted by one of said operational nodes is not received by another of said operational nodes.

5. The system as set forth in claim 1, wherein one of said monitoring nodes transmits a feedback message to be received by one or more of said operational nodes.

6. The system as set forth in claim 5, wherein said feedback message comprises feedback information, and wherein said feedback information is used to change a behavior of said operational node receiving said feedback message.

7. The system as set forth in claim 5, further comprising a feedback channel, wherein said feedback channel is dedicated for said operational nodes to receive said feedback message.

8. The system as set forth in claim 5, wherein the active period of said communication frame of said operational nodes comprises a time division multiple access (TDMA) schedule, wherein said TDMA schedule comprises a plurality of TDMA slots for sending and receiving said operational messages, and wherein one of said TDMA slots is dedicated for receiving said feedback message.

9. The system as set forth in claim 1, further comprising a computing device, wherein one of said monitoring nodes is communicatively connected to said computing device, wherein said state information received by the same monitoring node is transmitted to said computing device, and wherein the computing device provides power to the same monitoring node.

10. The system as set forth in claim 1, wherein said monitoring nodes continually listen for said state messages.

11. The system as set forth in claim 1, wherein said one or more monitoring nodes comprise two or more communicatively connected monitoring nodes.

12. The system as set forth in claim 1, wherein said state information is selected from the group consisting of a node identifier, a slot allocation, a number of collisions, a local energy supply, a number of neighbors, a state of the media access control (MAC), synchronization information, a reception level, a reception quality, and a current local random number.

13. In a wireless network comprising a plurality of operational nodes, a method of monitoring behavior and status of said operational nodes, said method comprising:
    (a) providing one or more monitoring nodes, wherein at least one of said monitoring nodes is communicatively connected to at least one of said operational nodes for receiving state information of said connected operational nodes;
    (b) providing a state transmit function for allowing each of said operational nodes to transmit a state message to be received by one or more of said monitoring nodes, wherein said state message comprises said state information of said operational node transmitting said state message; and
    (c) providing a state receive function for allowing one or more of said monitoring nodes to receive said state message transmitted by said operational nodes, wherein said state messages are for monitoring said operational nodes,
    wherein at least some of said operational nodes are wirelessly connected for communication with each other, wherein said operational nodes use repeated communication frames for said communication, wherein each of said communication frames comprise a first period which is an active period and a second period, wherein little or no activity occurs in said second period,
    wherein said operational nodes communicate with each other through one or more operational messages sent and received in said active period, and wherein said state message is transmitted in said second period.

14. The method as set forth in claim 13, wherein said state message is transmitted in a random position of said second period of said communication frame.

15. The method as set forth in claim 13, further comprising providing an intercept function for allowing said monitoring nodes to intercept said operational messages sent between said operational nodes.

16. The method as set forth in claim 15, further comprising associating one of said intercepted operational messages with one of said state messages, wherein both of said associated operational and state messages are transmitted by the same operational node, and wherein said associating is used to analyze the behavior of the transmitting operational node.

17. The method as set forth in claim 13, further comprising providing a feedback function for allowing said monitoring nodes to transmit a feedback message to be received by one or more of said operational nodes.

18. The method as set forth in claim 17, further comprising dedicating a feedback channel for said operational nodes to receive said feedback message.

19. The method as set forth in claim 17, wherein one of said operational nodes changes its behavior based on said received feedback message.

20. The method as set forth in claim 13, further comprising connecting one of said monitoring nodes to a computing device, wherein said state information received by said monitoring node connected to said computing device is transmitted to said computing device, and wherein said computing device provides power to the same monitoring node.

21. The method as set forth in claim 13, further comprising communicatively connecting at least two of said monitoring nodes, and correlating said state information received by said connected monitoring nodes.

22. The method as set forth in claim 13, further comprising moving one of said monitoring nodes from a first region of the wireless network to a second region of the wireless network, wherein said monitoring node is moved for monitoring said operational nodes of said first region and said second region.

* * * * *